(12) United States Patent
McCusker et al.

(10) Patent No.: US 8,755,954 B1
(45) Date of Patent: Jun. 17, 2014

(54) SYSTEM AND METHOD FOR GENERATING ALERT SIGNALS IN A TERRAIN AWARENESS AND WARNING SYSTEM OF AN AIRCRAFT USING A FORWARD-LOOKING RADAR SYSTEM

(75) Inventors: Patrick D. McCusker, Walker, IA (US); Joel M. Wichgers, Urbana, IA (US); Richard D. Jinkins, Rewey, WI (US); Richard M. Rademaker, Rijswijk (NL); Daniel L. Woodell, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 1513 days.

(21) Appl. No.: 11/904,491

(22) Filed: Sep. 27, 2007

(51) Int. Cl.
*G01S 13/94* (2006.01)

(52) U.S. Cl.
USPC .............. 701/9; 701/3; 701/4; 701/8; 342/65; 340/970; 340/977

(58) Field of Classification Search
USPC ......... 701/3–10, 14, 207, 208, 210, 301, 302, 701/409, 417, 448, 514, 532; 342/26 B, 342/29–32, 63, 65; 340/945, 963, 970, 977; 73/178 T
See application file for complete search history.

(56) References Cited

U.S. PATENT DOCUMENTS

| | | | |
|---|---|---|---|
| 3,165,740 A | 1/1965 | Stoney | |
| 3,241,068 A | 3/1966 | Moulton | |
| 3,568,187 A | 3/1971 | Bechtel et al. | |
| 3,739,380 A | 6/1973 | Burdic et al. | |
| 4,914,436 A | 4/1990 | Bateman et al. | |
| 5,487,172 A * | 1/1996 | Hyatt ............... | 712/32 |
| 5,839,080 A | 11/1998 | Muller et al. | |
| 6,092,009 A | 7/2000 | Glover | |
| 6,122,570 A | 9/2000 | Muller et al. | |
| 6,138,060 A | 10/2000 | Conner et al. | |
| 6,219,592 B1 * | 4/2001 | Muller et al. ............ | 701/9 |
| 6,591,171 B1 * | 7/2003 | Ammar et al. ............ | 701/16 |
| 7,145,501 B1 | 12/2006 | Manfred et al. | |
| 7,386,373 B1 * | 6/2008 | Chen et al. ............ | 701/9 |

OTHER PUBLICATIONS

Technical Standar Order—C151a, Nov. 29, 1999, Department of Transportation, Federal Aviation Administration.*

* cited by examiner

*Primary Examiner* — Khoi Tran
*Assistant Examiner* — Spencer Patton
(74) *Attorney, Agent, or Firm* — Donna P. Suchy; Daniel M. Barbieri

(57) ABSTRACT

A system and methods for generating alerts in a terrain awareness and warning system ("TAWS") in an aircraft, using data acquired from a forward-looking radar The system comprises a forward-looking imaging device, an airport database, a navigation system, a forward-looking terrain alert ("FLTA") processor, and a crew alerting system. The FLTA processor determines a measured clearance altitude of a highest cell within an area and compares it with a required minimum clearance altitude; if the measured altitude is equal or less than the required altitude, the crew is alerted. Alternatively, a terrain database may be used. with the FLTA processor for determining if the aircraft descends below the minimum operating altitude or is predicted to do so and then generating an alert. A method is disclosed for generating TAWS alerts using elevation angle measured by the forward-looking radar and terrain data retrieved from a terrain database.

11 Claims, 6 Drawing Sheets

SYSTEM AND METHOD FOR GENERATING ALERT SIGNALS IN A TERRAIN AWARENESS AND WARNING SYSTEM OF AN AIRCRAFT USING A FORWARD-LOOKING RADAR SYSTEM

BACKGROUND OF THE INVENTION

1. Field of the Invention

This invention pertains to the field of terrain awareness and warning systems employed in aircraft.

2. Description of the Related Art

Beginning in the early 1970's, a number of studies looked at the occurrence of "controlled flight into terrain" (CFIT)-type accidents, where a properly functioning airplane under the control of a fully qualified and certificated crew is flown into terrain (or water or obstacles) with no apparent awareness on the part of the crew. Findings from these studies indicated that many such accidents could have been avoided if a warning device called a ground proximity warning system ("GPWS") was used. There have been numerous patents issued in the field of GPWS and related art. A sampling of patents issued in the art and related art include U.S. Pat. Nos. 5,839,080; 6,092,009; 6,122,570; 6,138,060; 6,219,592; and 7,145,501.

Advances in technology have permitted vendors and designers of avionics equipment to develop newer type of GPWS that provides greater situational awareness for flight crews. The U.S. Federal Aviation Administration ("FAA") has classified such systems as Terrain Awareness and Warning Systems ("TAWS"). The advancement of technologies—more precise navigation systems, increased computer memory storage, and better display technology—have allowed further development of in the common features of TAWS: (1) use of airplane position information from the aircraft's navigation system(s), (2) an onboard terrain database, and (3) a means of displaying the surrounding terrain. Aircraft position information from the aircraft's navigation system is fed to a TAWS computer. The TAWS computer compares the airplane's current position and flight path with the terrain database associated with the system. If there is a potential threat of collision with terrain, the TAWS computer sends warning alerts to the airplane's audio system.

There are scenarios for which TAWS has been implemented. These scenarios may be categorized by the flight operations in which aircraft accidents have occurred: departure operations, enroute operations, and arrival operations. First, departure operations could include accidents in which the aircraft does not climb fast enough to clear a terrain cell of interest and in which a pilot has leveled off before the aircraft has achieved the appropriate altitude to clear the terrain. Second, enroute operations could include accidents associated with level flight into terrain and descending flight into terrain. Third, arrival operations could include accidents associated with premature descents and late level-offs in a step down arrival procedure. The embodiments disclosed herein present novel and non-trivial system and methods which address these scenarios.

While traditional terrain avoidance systems have primarily comprised of acquiring the current position (e.g., latitude and longitude) of an aircraft in flight for a navigation system such as a global navigation satellite system (e.g., global positioning system ("GPS"), retrieving terrain data corresponding to the current position from a terrain database, presenting the terrain information on a display unit in the cockpit of the aircraft, and generating warnings to pilots if specified warning criteria have been met, another source of terrain information may be acquired from a forward-looking radar system. A common example of such system is a weather radar system in which weather information in front and below an aircraft may be acquired and ultimately presented on a display unit.

Forward-looking radar systems installed in aircraft are known to those skilled in the art to produce terrain images often referred to as "ground clutter." While such images are often considered negatively as impairing the quality of the acquired data, the embodiments herein utilize such data to provide an alternate source of terrain information. For instance, the embodiments herein do not require the installation of a terrain database to provide terrain clearance information. In addition, the terrain data received from forward-looking radar systems may be used in conjunction with a terrain database and GPS system to produce a hybrid measurement of terrain data having a higher confidence level than either system can produce separately.

BRIEF SUMMARY OF THE INVENTION

The embodiments disclosed herein present novel and non-trivial system and methods for generating and providing alerts using a forward-looking radar system by acquiring line-of-sight terrain information. A forward-looking radar system may be used to identify and capture terrain data of a terrain cell having the highest elevation. This information along with information provided by a navigation system is provided to a forward-looking terrain alert ("FLTA") processor. In the embodiments herein, a measured terrain clearance altitude ("measured TCA") may be derived from the range and elevation angle measurements acquired by the forward-looking radar system and compared with a required terrain clearance altitude ("required TCA"). A required TCA may be one associated with minimum standards published by an aviation regulatory authority such as the FAA. Such standards may be categorized by phases of flight (e.g., terminal, approach, departure, and enroute), flight attitudes (e.g., level, descending, or climbing flight), or both, information which may be dependent on airport-related data contained in an airport navigating database.

In one embodiment, a system comprises a forward-looking imaging device system, an airport database, a navigation system, a FLTA processor, and a crew alerting system. An FLTA processor determines a measured TCA of a highest terrain cell within the search volume of a forward-looking radar system and compares it with a required TCA, where the required TCA is based upon a phase of flight in which the aircraft is operating and flight attitude of the aircraft; if the measured TCA is equal to or less than the required TCA, the FLTA processor generates an alert signal and provides such signal to a crew altering system comprising a display unit and aural alert unit.

In an alternative embodiment, a terrain database is included in the system and an FLTA processor determines if an aircraft is operating below a minimum operating altitude of the highest terrain cell, which such altitude is based on a phase of flight and flight attitude; if the aircraft descends below the minimum operating altitude, the FLTA generates an alert signal and provides the signal to a crew altering system.

In an alternative embodiment, a terrain database is included in the system and an FLTA processor determines if an aircraft is operating below descent caution altitude, where such altitude as a function of the phase of flight and flight attitude parameter, the vertical speed data, the elevation data of the highest terrain cell, and a caution alert altitude configurable as a function of the phase of flight and flight attitude parameter and the vertical speed data; if the aircraft descends below the descent caution altitude, the FLTA generates an alert signal and provides the signal to a crew altering system.

In an alternative embodiment, a terrain database is included in the system and an FLTA processor determines if an aircraft is operating below descent warning altitude, where such altitude as a function of the phase of flight and flight attitude parameter, the vertical speed data, the elevation data of the highest terrain cell, and a warning alert altitude configurable as a function of the phase of flight and flight attitude parameter and the vertical speed data; if the aircraft descends below the descent warning altitude, the FLTA generates an alert signal and provides the signal to a crew altering system.

In another embodiment, a method is disclosed in which it is determined whether the measured TCA is equal to or less than the required TCA; if so, an alert signal is generated and provided to a crew altering system comprising a display unit and aural alert unit.

In an alternative embodiment, a method is disclosed in which it is determined whether an aircraft is operating below a minimum operating altitude of the highest terrain cell, which such altitude is based on a phase of flight and flight attitude; if the aircraft descends below the minimum operating altitude, an alert signal is generated and provided to a crew altering system.

In an alternative embodiment, a method is disclosed in which it is determined whether an aircraft is operating below descent caution altitude, where such altitude as a function of the phase of flight and flight attitude parameter, the vertical speed data, the elevation data of the highest terrain cell, and a caution alert altitude configurable as a function of the phase of flight and flight attitude parameter and the vertical speed data; if the aircraft descends below the descent caution altitude, an alert signal is generated and provided to a crew altering system.

In an alternative embodiment, a method is disclosed in which it is determined whether an aircraft is operating below descent warning altitude, where such altitude as a function of the phase of flight and flight attitude parameter, the vertical speed data, the elevation data of the highest terrain cell, and a warning alert altitude configurable as a function of the phase of flight and flight attitude parameter and the vertical speed data; if the aircraft descends below the descent warning altitude, an alert signal is generated and provided to a crew altering system.

In another embodiment, a second method is disclosed in which a minimum operating altitude is determined as a function of the combined elevation of a highest terrain cell and a required TCA. A climb gradient is defined, where such gradient is based on the aircraft position and altitude and the location of the highest terrain cell and the minimum operating altitude; if the aircraft breaches the climb gradient, an alert signal is generated and provided to a crew altering system. The combined elevation of the highest terrain cell may be based on the greater elevation value between the measured elevation and surveyed elevation retrieved from a terrain database, a function of a quality of the measured range, azimuth, and elevation angle data, or a function of the phase of flight and flight attitude parameter.

In an alternative embodiment, a method is disclosed in which a descent caution altitude is defined as a function of the phase of flight and flight attitude parameter, the vertical speed data, the elevation data of the highest terrain cell, and a caution alert altitude configurable as a function of the phase of flight and flight attitude parameter and the vertical speed data; if the aircraft descends below the descent caution altitude, an alert signal is generated and provided to a crew altering system.

In an alternative embodiment, a method is disclosed in which a descent warning altitude is defined as a function of the phase of flight and flight attitude parameter, the vertical speed data, the elevation data of the highest terrain cell, and a warning alert altitude configurable as a function of the phase of flight and flight attitude parameter and the vertical speed data; if the aircraft descends below the descent warning altitude, an alert signal is generated and provided to a crew altering system.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
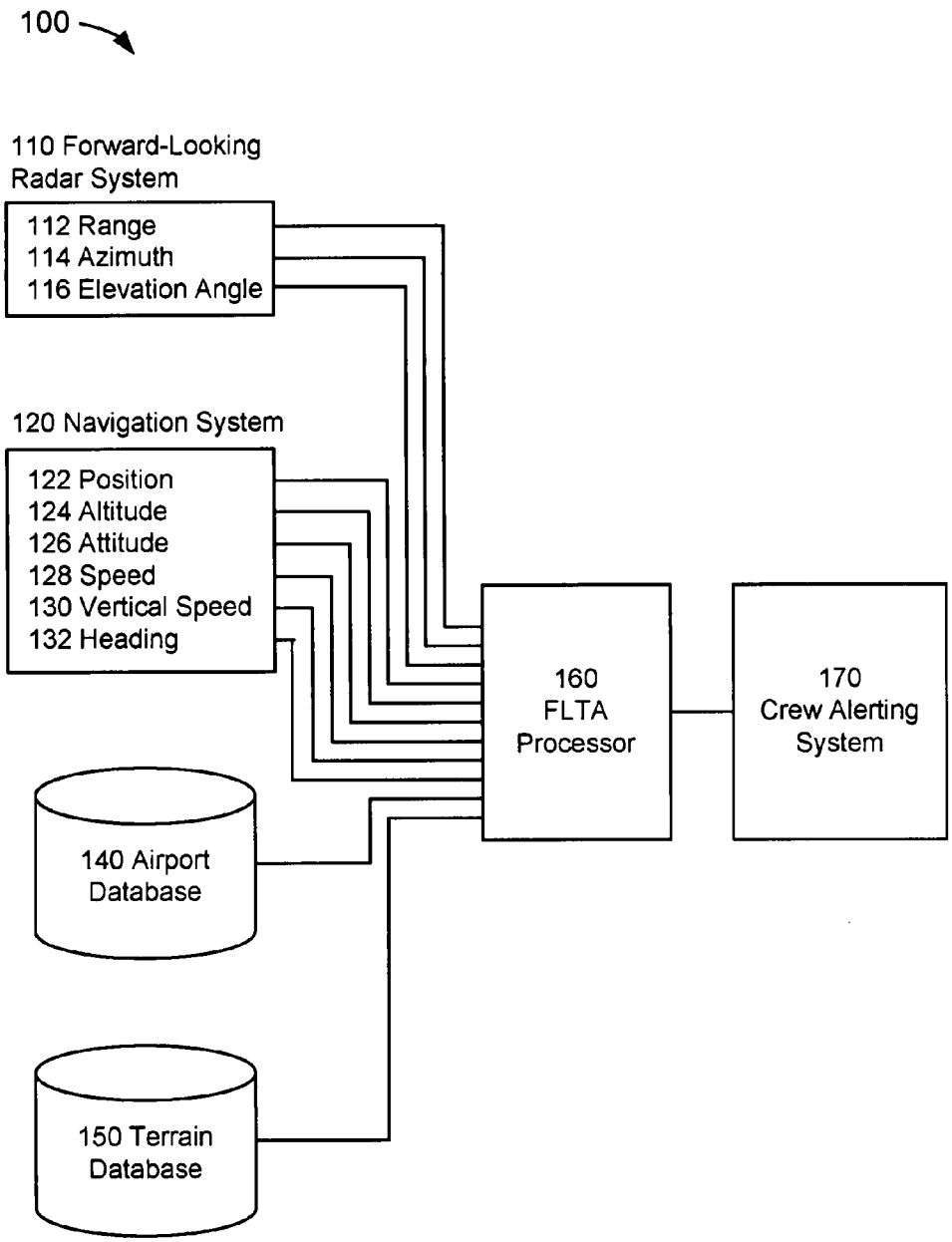
FIG. 1 depicts a block diagram of a system for providing alerts in a terrain-awareness and warning system.

FIG. 1 depicts a forward looking terrain avoidance system 100 suitable for implementation of the techniques described herein. The system may be comprised of a forward-looking radar system 110, a navigation system 120, an airport database 140, a terrain database 150, a forward-looking terrain alert ("FLTA") processor 160, and a crew alerting system 170.

A forward-looking radar system 110 is well-known to those skilled in the art. A common example of a forward-looking radar system 110 is a weather radar system. A forward-looking radar system 110 may be comprised of, in part, a transceiver and antenna. A transceiver may transmit microwaves into the atmosphere via an antenna which, in turn, produces a focused beam. The transceiver may control the direction of the beam by steering the antenna horizontally and vertically. When the signal strikes or reflects off an object such as terrain, part of the microwave energy is reflected back and received by the antenna. The range 112 of the object may be determined by the transceiver by measuring the elapsed time between the transmission and reception of the signal. The azimuth 114 of the object may be determined as the angle to which the antenna was steered in the horizontal direction relative to the longitudinal axis of the aircraft during the transmission/reception of the signal. The elevation or elevation angle 116 of the object may be determined as the angle to which the antenna was steered in the vertical direction relative to the longitudinal axis of the aircraft during the transmission/reception of the signal. As embodied herein, a forward-looking radar system 110 could acquire terrain data including, but not limited to, range 112, azimuth 114, and elevation angle 116, and based upon the acquired signals, could determine the highest terrain cell. Then, this terrain data could be provided to an FLTA processor 160 for subsequent processing as discussed below. In another embodiment, the acquisition of such terrain data could be limited or bounded in the lateral direction (i.e., the direction of the horizontal scan) in which the highest terrain cell would be that falling within the lateral bounds.

A navigation system 120 includes those systems that provide navigation data information to the pilot. A navigation system 120 may include, but is not limited to an air/data system, attitude heading reference system, an inertial guidance system (or inertial reference system), global navigation satellite system (or satellite navigation system), and flight management computing system, of all which are known to those skilled in the art. As embodied herein, a navigation system 120 could provide navigation data including, but not limited to, aircraft position 122, altitude 124, attitude 126, speed 128 vertical speed 130, and heading 132 to an FLTA processor 160 for subsequent processing as discussed herein. In an alternative embodiment, the navigation system 120 could provide heading data. Navigation data may be used, in part, to identify a phase of flight of an aircraft in flight and flight attitude, two parameters which may be used to define minimum terrain clearance standards in a terrain awareness and warning system.

An airport database 140 may be used to store airport-related data including, but not limited to, airport and runway information. Airport information could include surveyed location and elevation data, and runway information could include surveyed location and elevation data of the runway and runway threshold. Airport-related data may be used, in part, to identify a phase of flight of an aircraft in flight, a parameter which may be used to define minimum terrain clearance standards in a terrain awareness and warning system. An example of a database which may provide a source of airport-related data as embodied herein may be a navigation database included as part of a flight management computing system. As embodied herein, an airport database 140 could provide airport-related data to an FLTA processor 160 for subsequent processing as discussed herein.

A terrain database 150 may be used to store terrain data contained in digital elevation models ("DEM"). Generally, the terrain data of a DEM is stored as grids, and each grid represents an area of terrain. A grid is commonly referred to as a terrain cell. A grid may be of various shapes. For example, a grid may be a square cell defined in arc-minutes of latitude and longitude, or a grid may be circular. A grid may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with GTOPO30 data set by an approximately ratio of 900:1. At the present time, resolutions of one-arc second for SRTM terrain data are available for areas over the United States; for all other locations, resolutions of three arc-seconds (approx. 90 meters) are available. In addition to these public sources of terrain data, various vendors and designers of avionics equipment have developed databases that have been, for all intents and purposes, proprietary in nature.

Data contained in a terrain data cell may include the value of the highest elevation found within the cell. In an embodiment herein, a terrain database 150 could a plurality of terrain cells, each having a values of the highest elevation found within the cell. Alternatively, data contained in a terrain data cell could be a minimum operating altitude which could be the sum of the highest elevation found within the terrain cell and a required terrain clearance altitude specified in a terrain awareness and warning system, where the minimum operating altitude may depend upon a phase of flight (e.g., enroute, terminal, approach, and departure) and flight attitudes (e.g., level, descent, and climb). If terrain data is comprised of minimum operating altitudes, then terrain database 150 could store a minimum operating altitude per phase of flight and flight altitude in one embodiment. A terrain database 150 may also be comprised of one or more databases where each database stored one or more minimum operating altitudes corresponding to specific phases of flight and flight attitudes.

An FLTA processor 160 may receive input data from various systems including, but not limited to, a forward-looking radar system 110, a navigation system 120, an airport database 140, and a terrain database 150 for processing as discussed herein. An FLTA may also generate output data or signals to various systems including, but not limited to, a crew alerting system 170. For example, an FLTA processor 160 may provide one or more alerts signals to a crew alerting system 170 for providing aural and visual alerts to the pilot as discussed herein.

An FLTA processor 160 may receive input data from various systems including, but not limited to, a forward-looking radar system 110, a navigation system 120, an airport database 140, and a terrain database 150. An FLTA processor 160 may be electronically coupled to a navigation system 120, an airport database 140, and a terrain database 150 to facilitate the receipt of input data. It is not necessary that a direct connection be made; instead, such receipt of input data could be provided through a data bus or through a wireless network.

An FLTA processor 160 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. An FLTA processor 160 may be driven by the execution of software or source code containing algorithms developed for the specific functions embodied herein. Common examples of an electronic data processing units are microprocessors and signal generators; however, for the embodiments herein, the term processor is not limited to the microprocessor and its meaning is not intended to be construed narrowly. For instance, a processor could also consist of more than one electronic data processing units.

A crew alerting system 170 includes those systems that provide, in part, aural and visual alerts to the pilot, alerts that could be visual, aural, or tactile stimulus presented to attract attention and convey information regarding system status or condition. A crew alerting system 170 may include, but is not limited to, an aural alert unit for producing aural alerts and a display unit for producing visual alerts. Aural alerts may be discrete sounds, tones, or verbal statements used to annunciate a condition, situation, or event. Visual alerts may be information that is projected or displayed on a cockpit display unit to present a condition, situation, or event to the pilot. In addition, alerts may be based on conditions requiring immediate crew awareness or attention. Caution alerts may be alerts requiring immediate crew awareness in which subsequent corrective action will normally be necessary. Warning alerts may be alerts for detecting terrain threat that requires immediate crew action. Both caution and warning alerts may be presented as aural alerts, visual alerts, or both simultaneously. When presented visually, one or more colors may be presented on a display unit indicating one or more levels of alerts. For instance, yellow may indicate a caution alert and red may indicate a warning alert.

A crew alerting system 170 may receive input data from various systems including, but not limited to, an FLTA processor 160. A crew alerting system 170 may be electronically coupled to an FLTA processor 160 to facilitate the receipt of input data. It is not necessary that a direct connection be made; instead, such receipt of input data could be provided through a data bus or through a wireless network.

Figure 2:
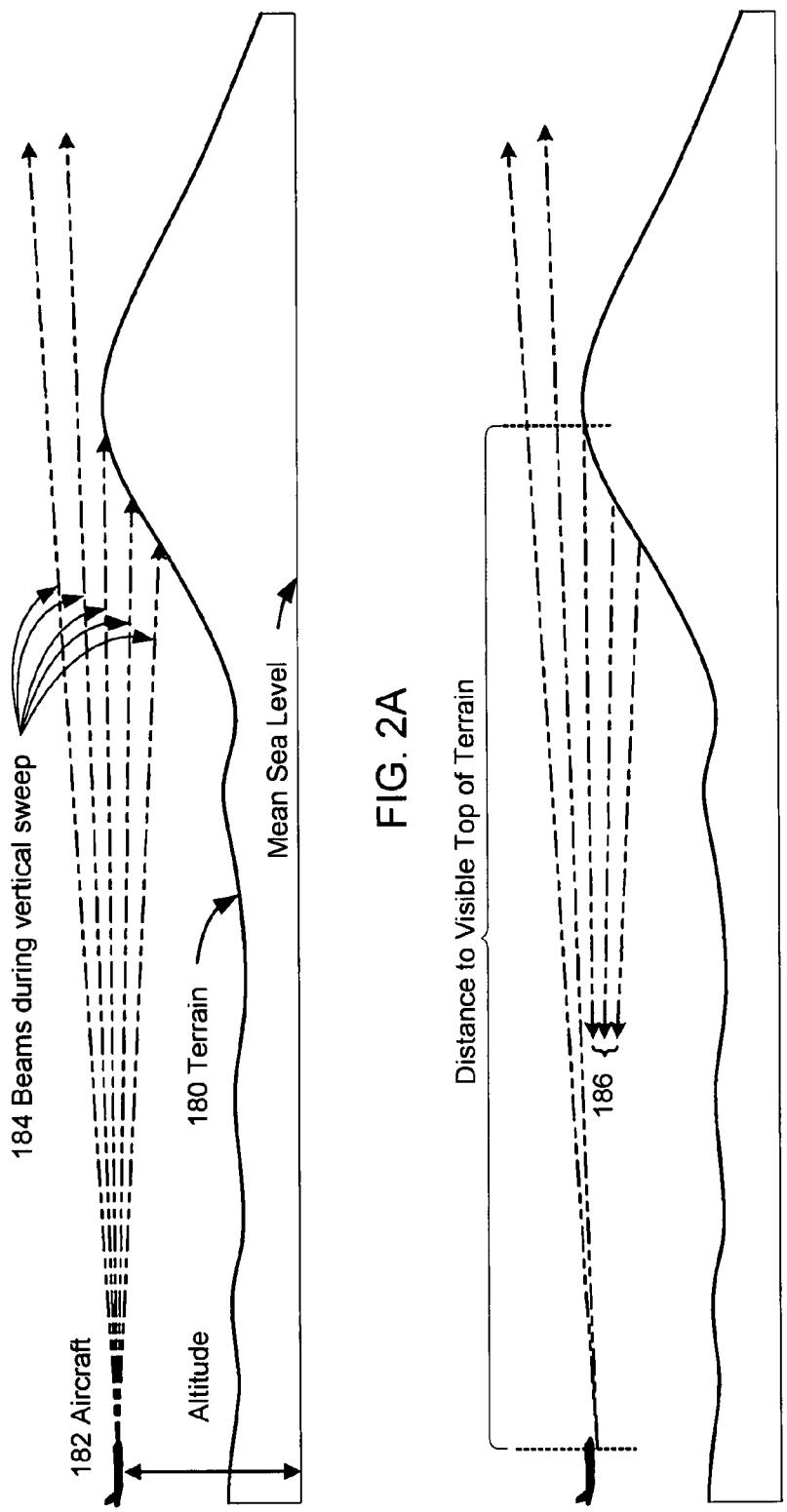
FIG. 2A depicts an exemplary illustration of a forward-looking radar system transmitting microwave signals.
FIG. 2B depicts an exemplary illustration of signals striking or reflecting off terrain.

The advantages and benefits of the embodiments discussed herein may be illustrated by showing examples of using a forward-looking radar system in a terrain awareness and warning system. FIG. 2A provides an exemplar depiction of a forward-looking radar system 110 used in identifying terrain 180 in a search volume forward of the aircraft and around the projected path, where the search volume may be considered as the area swept or scanned horizontally and vertically for terrain. A transceiver (not shown) of the forward-looking radar system 110 may transmit microwave signals into the atmosphere via an antenna (not shown) which, in turn, produces a focused beam 184 (several beams shown in a vertical sweep). The transceiver may control the direction of each beam by steering the antenna horizontally and vertically causing the search volume to be scanned or swept. Horizontal scanning may be used to build an estimate of the terrain in a wide area in front of the aircraft 182. Vertical scanning (shown in FIG. 2A) may be used to identify terrain cells of interest which represent potential threats to continued safe flight of the aircraft.

When a signal strikes or reflects off terrain as shown in FIG. 2B, the microwave energy in each signal reflected back (shown as item 186) is received by the antenna, and an estimate in range may be made. When the antenna is either slewed vertically or multiple horizontal antenna scans are moved vertically, radar returns will drop off as the radar is scanned above the highest point in the terrain. In other words, radar return power will occur at longer and longer ranges until the antenna beam no longer illuminates even the highest point in terrain. The antenna elevation angle may be used as an estimate as the angle to the terrain visible top. Other methods can be used as well to find the top of terrain. For instance, the monopulse or sequential lobing techniques are known to the skilled in the art and may be used to estimate the angle to terrain by finding the highest angle to terrain in view. Both the top of terrain angle and the range to the terrain top may be developed. The location of the "visible top" may be provided to a processor. By using a forward-looking radar system to locate terrain of interest such as the top of the terrain, this could eliminate the need for continually searching a terrain database for one or more terrain cells which could conflict with the projected flight path of the aircraft. This could provide an advantage and benefit to terrain awareness and warning systems.

Figure 3:
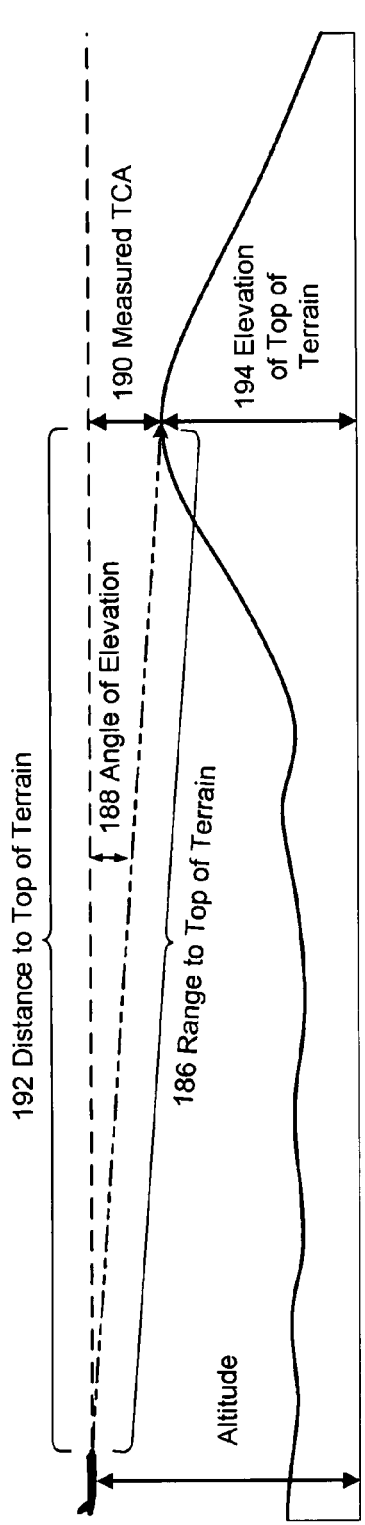
FIG. 3 provides an exemplary illustration of terminologies that may be used in the embodiments herein.

FIG. 3 provides an exemplary depiction of forward-looking radar system used when terrain of interest such as the top of the terrain has been detected in front of the aircraft. When terrain of interest is detected, the transceiver may determine the range to the top of terrain 186 and angle of elevation 188 relative to the extended body axis of the aircraft. After these values are computed, the measured terrain clearance altitude ("measured TCA") 190 and distance to the top of the terrain 192 relative to the flight path may be computed using trigonometric functions. Alternatively, the measured TCA 190 and distance to the top of the terrain 192 may also be computed when the aircraft is operating in a downward pitch attitude by including the angle of pitch attitude as part of the computations. Once the measured TCA 190 has been determined, then the elevation of the terrain of interest 194 may be computed as the difference between aircraft altitude and the measured TCA 190.

Figure 4:
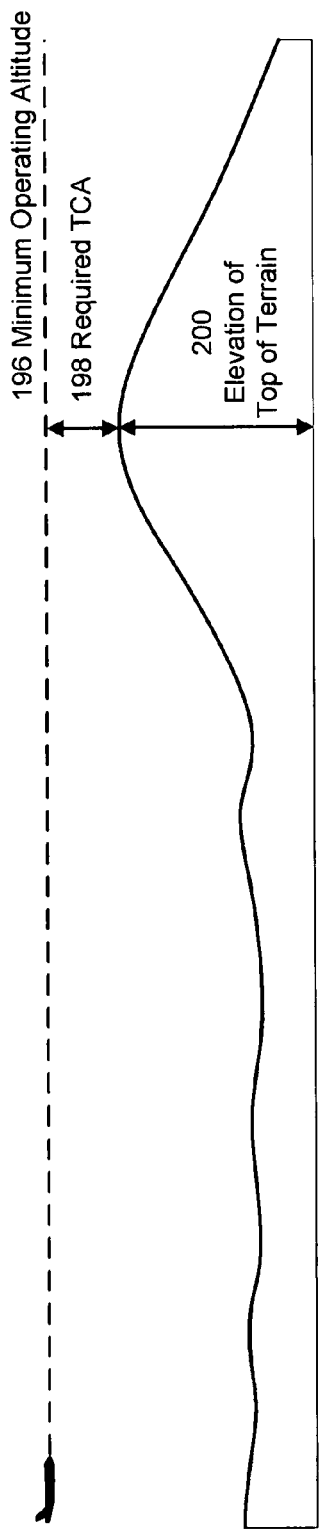
FIG. 4 provides an exemplary illustration of terminologies that may be used in the embodiments herein.

FIG. 4 provides an exemplary depiction of two parameters that may be part of a terrain awareness and warning system. Such system may require an aircraft to operate at or above a minimum operating altitude 196; otherwise, the system could generate an alert. The value of the minimum operating altitude 196 is the value of a required terrain clearance altitude ("required TCA") 198 added to the elevation of top of terrain 200 (the required TCA 198 is discussed below). By comparing the measured TCA 190 of FIG. 3 with a required TCA 198 of FIG. 4, an aircraft will be operating at or above the minimum operating altitude 196 if the measured TCA 190 of the forward-looking radar system equals or exceeds a required TCA 198. By comparing these two parameters, it may be determined whether the aircraft is operating at a safe altitude in accordance with a terrain awareness and warning system. In an embodiment herein, if an aircraft is flying at or below the required TCA 198 or minimum operating altitude 196, an alert signal could be generated and provided to a crew alerting system 170.

Figure 5A:
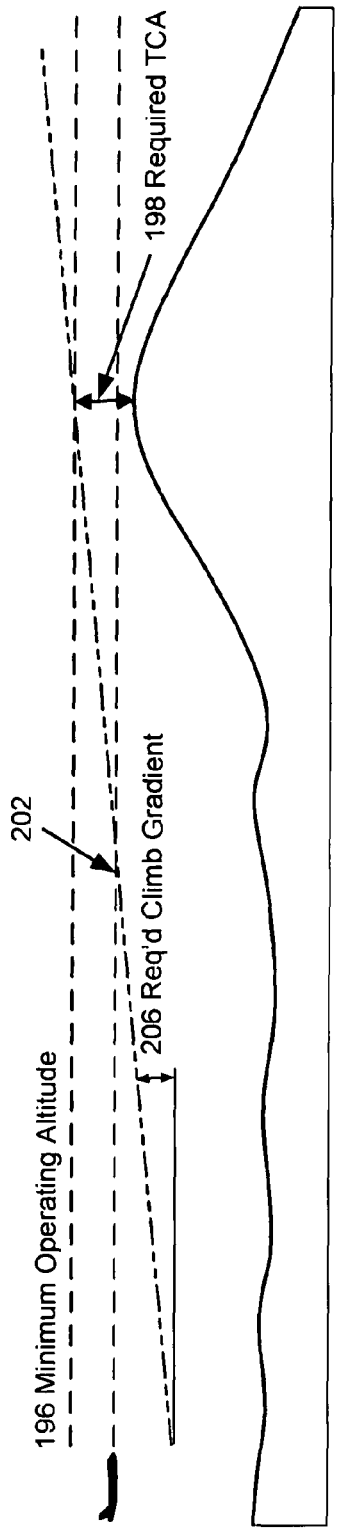
FIG. 5A provides an exemplary illustration of an aircraft flying at an altitude above the highest elevation of a terrain cell but below a required TCA.
Figure 5B:
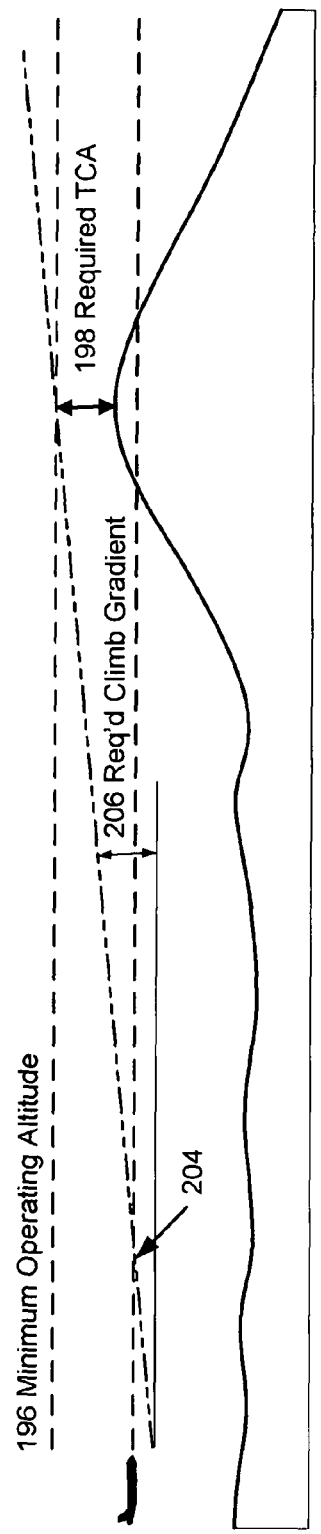
FIG. 5B provides an exemplary illustration of an aircraft flying at an altitude below the highest elevation of a terrain cell.

FIGS. 5A and 5B provide exemplary depictions when an aircraft is operating below the minimum operating altitude 196. In FIG. 5A, the aircraft is operating above the elevation of top of terrain; in FIG. 5B, the aircraft is operating below the elevation of top of terrain. In an embodiment herein, when an aircraft is flying during either of these operations, a terrain awareness and warning system may require an alert to be generated if the aircraft passes a point (items 202 and 204) at which the aircraft must be operated at a required climb gradient 206 to cross the top of terrain at a required TCA 198 and minimum operating altitude 196. As embodied herein, the degree or angle of the required climb gradient may be configured by the user of the system.

The value of a required TCA 198 may not remain constant between take-off and landing. Instead, the value of a required TCA 198 may depend on the different phases of flight (e.g., terminal, approach, departure, and enroute), flight attitudes (e.g., level, descending, or climbing flight), or both.

A terminal phase of flight could exist when the aircraft is a pre-defined distance (e.g., 15 nautical miles) or less from the nearest runway while the range to the nearest runway threshold is decreasing and the aircraft is operating at or below (lower than) an upper terminal phase boundary altitude, where the value of the upper terminal phase boundary altitude varies as a function of height above runway and distance to the runway. Generally, the terminal phase of flight ends where the approach phase begins.

An approach phase of flight could exist when the aircraft is a pre-defined distance (e.g., 5 nautical miles) or less to the nearest runway threshold, the height above the nearest runway threshold location and elevation is equal to or less than a pre-defined altitude (e.g., 1,900 feet), and distance to the nearest runway threshold is decreasing.

A departure phase of flight could exist if an aircraft is on the ground upon initial power-up. A reliable parameter may be used to determine whether or not the aircraft is on the ground. For example, one parameter which could initially determine the aircraft to be on the ground could be a signal generated by a "squat switch" to indicate whether or not the aircraft is on the ground. Other parameters such as speed and altitude could be used to determine if the aircraft is on the ground or airborne. For example, an aircraft could be "on the ground" if it is operating at a speed less than 35 knots and altitude within +/−75 feet of field elevation or nearest runway elevation. Similarly, an aircraft could be "airborne" if it is operating at a speed greater than 50 knots and altitude 100 feet greater than field elevation; in this example, it can be reliably determined that the aircraft is operating in the departure phase of flight. Other parameters which may be considered are climb state, and distance from departure runway. Once the aircraft reaches a pre-defined altitude (e.g., 1,500 feet above the departure runway), the Departure Phase could end.

An enroute phase of flight may exist anytime the aircraft is more than a pre-defined distance (e.g., 15 nautical miles) from the nearest airport or whenever the conditions for terminal, approach and departure phases of flight are not met.

As embodied herein, the value of a required TCA 198 may depend on a phase of flight and flight attitude. For example, if an aircraft is operating in the enroute phase of flight, a required TCA 198 could be 700 feet if operating in level flight attitude and 500 feet if operating in descending flight attitude. In another example, if an aircraft is operating in the terminal phase of flight, a required TCA 198 could be 350 feet if operating in level flight attitude and 300 feet operating in descending flight attitude. In another example, if an aircraft is operating in the approach phase of flight, a required TCA 198 could be 150 feet if operating in level flight attitude and 100 feet operating in descending flight attitude. The value of a required TCA 198 may depend on the phase of flight and not flight attitude. For example, if an aircraft is operating in the departure phase of flight, a required TCA 198 could be set to one value (e.g., 100 feet) irrespective of flight attitude. It should also be noted that level flight attitude may or may not include aircraft operating at relatively low vertical speeds and the values may differ across the phases of flight. For example, an aircraft climbing or descending at a rate of 500 feet per minute or less may be considered as operating in level flight in one phase of flight but not in another.

In an embodiment, an aircraft may be operating above a minimum operating altitude 196 in a descending phase of flight. In such operation, one or more alerts may be generated at a configurable height above terrain based upon the vertical speed of the aircraft and phase of flight through which the aircraft is descending. For example, in an enroute phase of flight, one alert such as a caution alert may be generated at an altitude of 1200 feet above the terrain if the aircraft is descending at a rate of 1000 feet per minute and 1800 feet above the terrain if descending at 4000 feet per minute. In another example, in the enroute phase of flight, another alert such as a warning alert may be generated at an altitude of approximately 570 feet above the terrain if an aircraft is descending at a rate of 1000 feet per minute and approximately 980 feet if descending at a rate of 4000 feet per minute.

In another example, in a terminal phase of flight, a caution alert may be generated at an altitude of 700 feet above the terrain if the aircraft is descending at a rate of 1000 feet per minute and 1100 feet above the terrain if descending at 3000 feet per minute. In another example, in the terminal phase of flight, a warning alert may be generated at an altitude of approximately 330 feet above the terrain if an aircraft is descending at a rate of 1000 feet per minute and approximately 500 feet if descending at a rate of 3000 feet per minute.

In another example, in an approach phase of flight, a caution alert may be generated at an altitude of 350 feet above the terrain if the aircraft is descending at a rate of 500 feet per minute and 550 feet above the terrain if descending at 1500 feet per minute. In another example, in the approach phase of flight, a warning alert may be generated at an altitude of approximately 110 feet above the terrain if an aircraft is descending at a rate of 500 feet per minute and approximately 160 feet if descending at a rate of 1500 feet per minute.

As shown above, an altitude above terrain at which an alert could be generated is variable and may be dependent on the phase of flight and the vertical speed. If the elevation of the highest terrain cell is known, then the actual aircraft altitude at which an alert may be generated may be determined by the FLTA processor 160. A user of the system may configure an alert altitude as a function of the phase of flight and the vertical speed. In an embodiment herein, a descent caution altitude for the generation of a caution alert may be determined based upon the phase of flight, the vertical speed, and the altitude above terrain which the user has configured as a function of the phase of flight and the vertical speed. In another embodiment herein, a descent warning altitude for the generation of a warning alert may be determined based upon the phase of flight, the vertical speed, and the altitude above terrain which the user has configured as a function of the phase of flight and the vertical speed.

Those skilled in the art will recognize the values used in the preceding examples are associated with some of the minimum performance standards of a Terrain Awareness and Warning System ("TAWS") published by the United States Federal Aviation Administration ("FAA") in TSO-C151b. Although TSO-C151b states specific values of minimum terrain clearance altitudes, those skilled in the art will readily acknowledge that aviation regulatory authorities such as the FAA may modify minimum performance standards with subsequent changes, amendments, or revisions. In addition, other aviation regulatory authorities could develop separate minimum performance standards which differ from those published by the FAA. In addition, a pilot or owner of an aircraft may decide to configure one or more of the parameters discussed above. The embodiments and discussion herein with respect to phases of flight and values of required TCAs 198 are illustrations intended solely to provide examples and are in no way intended to be limited to those discussed and presented herein. As embodied herein, an FLTA processor 160 may determine phase of flight, flight attitude, and required TCA 198 data through the use of algorithms programmed in executable software code. Those skilled in the art will appreciate the ability and ease with which executable software code may be reprogrammed or modified to facilitate subsequent or concurrent performance standards without affecting or expanding the scope of the embodiments discussed herein.

Referring back to FIG. 3, the measured TCA 190 is shown to be proportional to range 186 and angle of elevation 188. For any given angle of elevation 188, the measured TCA 190 will increase with an increase in range and decrease with a decrease in range. For any given range 186, the measured TCA 190 will increase with an increase in angle of elevation and decrease with a decrease in angle of elevation 188.

Given this proportional relationship, any error that is present during the operation of the elevation function of the forward-looking radar system could have an effect on the value of the measured TCA 190. The magnitude of such effect would become more pronounced with increases in the range to the terrain in interest. If there is a one-half degree($\frac{1}{2}°$) of error in the angle of elevation 188, a vertical error in the measured TCA 190 of approximately 16 meters for every 1.0 nm of range would result. At ranges of 5 nm and 10 nm, the vertical error would be approximately 80 meters and 160 meters, respectively. If an error in the angle of elevation is present, the magnitude of the corresponding error decreases as the aircraft approaches the terrain in interest.

To address the possible existence of error in the angle of elevation 188 and accompanying vertical error in the measured TCA 190, other sources of terrain information may be used such as an altitude 196 measurement derived from a global navigation satellite system of global positioning system ("GPS") and terrain elevation information stored in a terrain database 150; however, such sources may also be subject to errors. For instance, the measured altitude from a GPS system could have an error of 25 meters at a 95% confidence level, and a worst case error of 140 meters. If elevation information contained in a terrain database is the same data collected from the SRTM, the stated height accuracy is 16 meters at a 90% confidence level. Using these figures for the purposes of illustration only, an error in a terrain clearance altitude calculated using GPS and SRTM terrain data could be approximately 156 meters using the worst case error for GPS or 41 meters using the values associated with differing confidence levels. It is seen that, unlike the errors associated with the forward-looking radar system, these errors are not dependent on the range to the terrain of interest.

By comparing the errors associated with a forward-looking radar system 110 and those associated with measured altitude and terrain database elevations, the former may provide a more accurate measurement of terrain clearance altitude as the aircraft approaches the terrain of interest, especially in those phases of flight in which the values of the required TCA 198 are comparatively lower. As discussed in the examples above, values of the required terrain clearance altitude associated with an approach phase of flight could be 100 feet (approximately 30 meters), which is less than the 41 meters associated with a measured altitude of a GPS and SRTM terrain data. On the other hand, values of the required terrain clearance altitude associated with an enroute phase of flight could be 700 feet (approximately 210 meters), which is more than the worse case error of 156 meters associated with a measured altitude of GPS and SRTM terrain data.

The benefits of the forward-looking radar system 110 and a GPS-SRTM terrain database system may be employed together by combining both to produce a more accurate value of a terrain clearance altitude associated with the terrain of interest. In one embodiment, the greater elevation value between the radar measured elevation and the surveyed elevation from SRTM terrain data could be used to generate an alert. In another embodiment, a quality factor may be assigned to radar-measured elevation based upon the quality of the range, azimuth, and measured elevation angle measurements, and an alert could be generated based upon a weighting or averaging of the quality factor. In another embodiment, terrain elevations retrieved from a GPS-SRTM terrain database system may be used in phases of flight and flight attitudes having relatively high terrain clearance requirements and terrain elevations derived from a forward-looking radar system may be used in phases of flight and flight attitudes having relatively low terrain clearance requirements.

Figure 6:
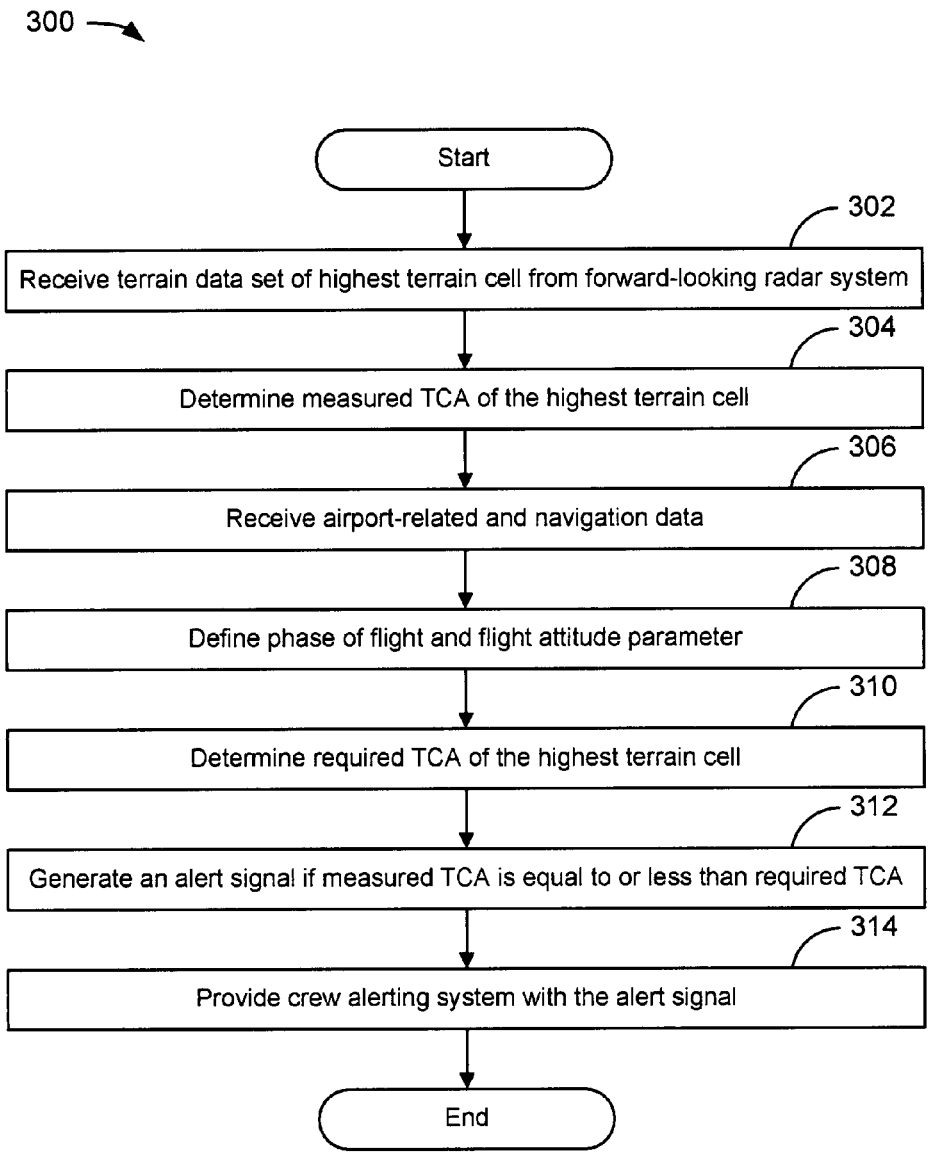
FIG. 6 provides a flowchart illustrating a first method for providing alerts in a terrain-awareness and warning system.

FIG. 6 depicts flowchart 300 of an example of a method for providing alerts in a terrain awareness and warning system using forward-looking radar system. The flowchart begins with module 302 with the receiving of a terrain data set of the highest terrain cell by an FLTA processor 160. This data had been acquired from a forward-looking radar system and may include, but is not limited to, measured range 112, azimuth 114, and elevation angle 116. In an additional embodiment, the measured azimuth 114 could be bounded by lateral limits that may be configurable to a user resulting in a lower search volume in which to determine the highest terrain cell. The flowchart continues with module 304 with the determining of a measured TCA 190 of the terrain data set. The flowchart continues with module 306 with the receiving of airport-related data from an airport database 140 and navigation data from a navigation system 120 such as aircraft position, altitude, and vertical speed data. The airport-related data could include both airport and runway information of the nearest airport. Airport information could include surveyed location and elevation data, and runway information could include surveyed location and elevation data of the runway and runway threshold. Airport-related data may be used, in part, to identify a phase of flight of an aircraft in flight, a parameter which may be used to define minimum terrain clearance standards in a terrain awareness and warning system.

The flowchart continues with module 308 with the defining of a phase of flight and flight attitude parameter. The phase of flight and flight attitude parameter may be defined using airport-related data and navigation data. The flowchart continues with module 310 with the determining of a required TCA 198 of the highest terrain cell. A required TCA 198 may be defined as a function of the phase of flight and flight attitude parameter.

The flowchart continues with module 312 with the generation of a first alert signal. A first alert signal may be generated by the FLTA processor 160 after comparing a measured TCA 190 and a required TCA 194. If a measured TCA 190 is equal to or less than a required TCA 194, then a first alert signal may be generated by an FLTA processor 160. The flowchart continues with module 314 with the providing of the first alert signal to the crew alerting system 170. This first alert signal may be a caution signal that could be displayed on a display unit, and it could be displayed in a color associated with the caution signal such as yellow or amber. This caution signal could cause an aural alert to be provided to the pilot through an aural alert unit, and it could be provided in a manner associated with the caution signal under the phase of flight and flight attitude parameter. Then, the flowchart proceeds to the end.

In an additional embodiment, the method of flowchart 300 may include heading information being received from the navigation system 120. Location and elevation data of the highest terrain cell may be retrieved from a terrain database 150, and a minimum operating altitude 196 may be defined based upon the elevation highest terrain cell and the required TCA 196 previously determined. A first climb gradient between two points may be determined, where the first point could be based upon the aircraft position and altitude, and the second point could be based upon the location of the highest terrain cell and the minimum operating altitude above the location. A second alert signal may be generated if the first climb gradient is equal to or less than a configurable second climb gradient and provided to a crew alerting system 170. This second alert signal may be a warning signal that could be displayed on a display unit, and it could be displayed in a color associated with the warning signal such as red. This warning signal could cause an aural alert to be provided to the pilot through an aural alert unit.

In an additional embodiment, the method of flowchart 300 may include a descent caution altitude being defined as a function of the phase of flight and flight attitude parameter, the vertical speed, and a caution alert altitude configurable as a function of the phase of flight and flight attitude parameter and vertical speed data. A third alert signal may be generated if the aircraft altitude is equal to or less than the descent warning altitude and provided to a crew alerting system 170 for presentation on a display unit, announcement to the pilot, or both.

In an additional embodiment, the method of flowchart 300 may include a descent warning altitude being defined as a function of the phase of flight and flight attitude parameter, the vertical speed, and a warning alert altitude configurable as a function of the phase of flight and flight attitude parameter and vertical speed data. A fourth alert signal may be generated if the aircraft altitude is equal to or less than the descent warning altitude and provided to a crew alerting system 170 for presentation on a display unit, announcement to the pilot, or both.

Figure 7:
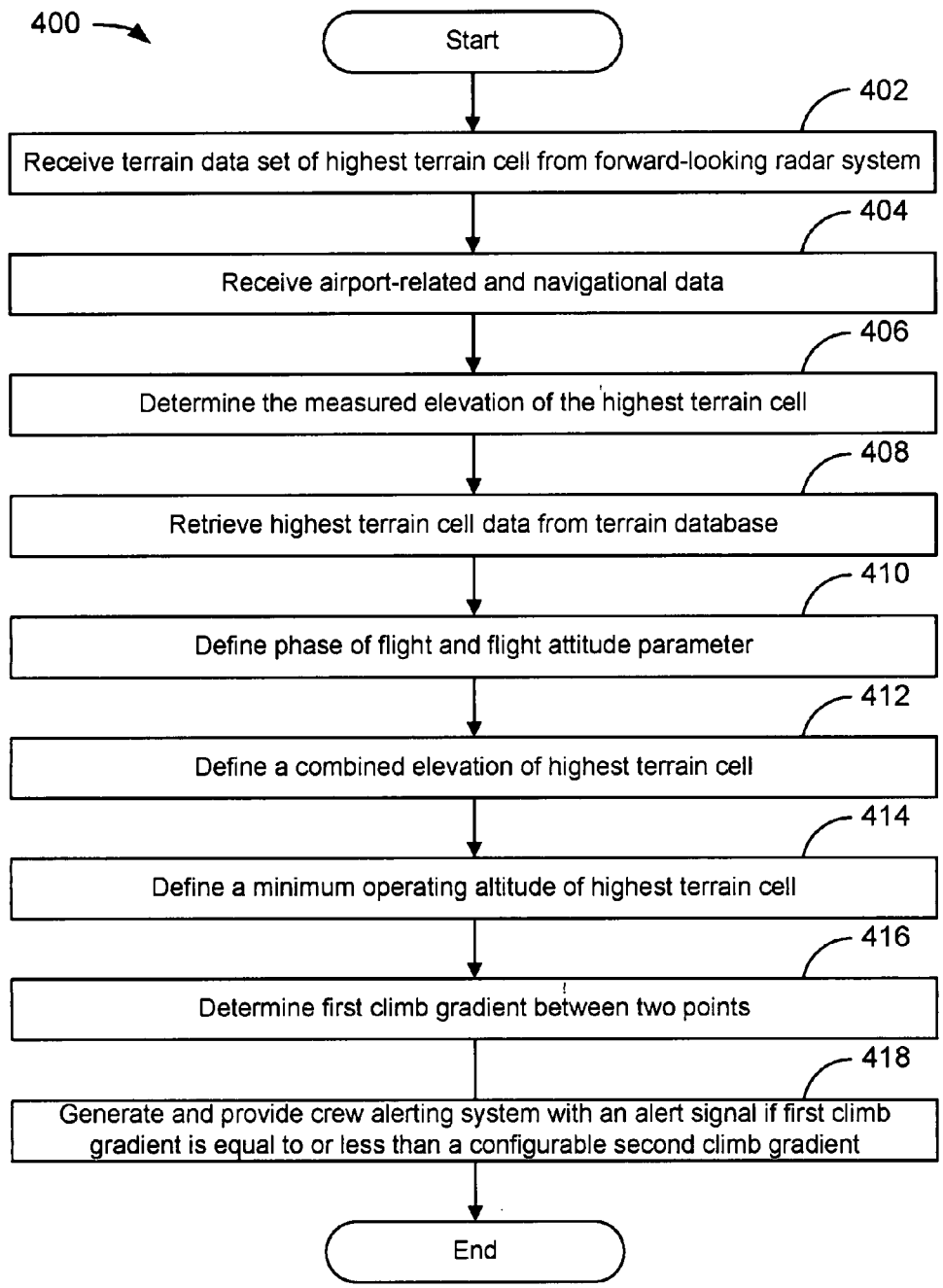
FIG. 7 provides a flowchart illustrating a second method for providing alerts in a terrain-awareness and warning system.

FIG. 7 depicts flowchart 400 of an example of a method for providing alerts in a terrain awareness and warning system using forward-looking radar system. The flowchart begins with module 402 with the receiving of a terrain data set of the highest terrain cell by an FLTA processor 160. This data had been acquired from a forward-looking radar system and may include, but is not limited to, measured range 112, azimuth 114, and elevation angle 116. In an additional embodiment, the measured azimuth 114 could be bounded by lateral limits that may be configurable to a user resulting in a lower search volume in which to determine the highest terrain cell. The flowchart continues with module 404 with the receiving of airport-related data from an airport database 140 and navigation data from a navigation system 120 such as aircraft position 122, altitude 124, vertical speed data 130, and heading 132. The airport-related data could include both airport and runway information of the nearest airport. Airport information could include surveyed location and elevation data, and runway information could include surveyed location and elevation data of the runway and runway threshold. Airport-related data may be used, in part, to identify a phase of flight of an aircraft in flight, a parameter which may be used to define minimum terrain clearance standards in a terrain awareness and warning system.

The flowchart continues with module 406 with the determining of a measured elevation of the highest terrain cell based upon measured range 112, measured elevation angle 116, and the aircraft altitude 126. The flowchart continues with module 408 with the retrieving of terrain data associated with the highest terrain cell from a terrain database 150 including the surveyed elevation of the highest terrain cell. The flowchart continues with module 410 with the defining of a phase of flight and flight attitude parameter. The phase of flight and flight attitude parameter may be defined using both airport-related data and navigation data.

The flowchart continues with module 412 with the defining of a combined elevation of the highest terrain cell. In one embodiment, the combined elevation of the highest terrain cell may be the greater value between the measured elevation and surveyed elevation. In another embodiment, the combined elevation may be the highest terrain cell determined as a function of the quality of the range, azimuth, and measured elevation angle measurements acquired by the forward-looking radar system. In another embodiment, the combined elevation of the highest terrain cell may be a function of the phase of flight and flight attitude parameter. For example, terrain elevations retrieved from a GPS-SRTM terrain database system may be used in phases of flight and flight attitudes that have high terrain clearance requirements, and terrain elevations derived from a forward-looking radar system may be used in phases of flight and flight attitudes that have low terrain clearance requirements.

The flowchart continues with module 414 with the defining of a minimum operating altitude based upon the combined elevation of the highest terrain cell and a required TCA 198. The required TCA 198 is determined as a function of phase of flight and flight attitude parameter. The flowchart continues with module 416 with the determining of a first climb gradient between two points. The first point may be based upon the aircraft position and altitude, and the second point may be based upon location of the highest terrain cell and the minimum operating altitude above the location. The flowchart continues with module 418 with the both the generation and providing of a first alert signal to a crew alerting system 170. The first alert signal may be generated if the first climb gradient is equal to or less than a configurable second climb gradient. The user may configure the second climb gradient to be a fixed angle or variable as a function to one or more of many inputs received by the FLTA processor 160. For example, the user may configure the second climb gradient to be a fixed angle such as 6 degrees. In another example, the user may configure the second climb gradient to be variable as a function of a navigation input such as altitude to account for a decrease aircraft performance that normally occurs with an increase in altitude. If generated, the first alert signal is provided to a crew alerting system 170. The first alert signal may be a caution signal or a warning signal that could be displayed on a display unit, and it could be displayed in a color associated with a caution signal such as yellow or with a warning signal such as red. The first alert signal could cause an aural alert to be provided to the pilot through an aural alert unit, and it could be provided in a manner associated with the caution signal under the phase of flight and flight attitude parameter. Then, the flowchart proceeds to the end.

In another embodiment, the method of flowchart 400 may include a descent caution altitude being defined as a function of the phase of flight and flight attitude parameter, the vertical speed, and a caution alert altitude configurable as a function of the phase of flight and flight attitude parameter and vertical speed data. A second alert signal may be generated if the aircraft altitude is equal to or less than the descent caution altitude and provided to a crew alerting system 170. The second alert signal may be a caution signal that could be displayed on a display unit, and it could be displayed in a color associated with the caution signal such as yellow or amber. This caution signal could cause an aural alert to be provided to the pilot through an aural alert unit.

In another embodiment, the method of flowchart 400 may include additional functionality. A descent warning altitude may be defined based upon the phase of flight and flight attitude parameter, the vertical speed, and a warning alert altitude configurable as a function of the phase of flight and flight attitude parameter and vertical speed data. A third alert signal may be generated if the aircraft altitude is equal to or less than the descent warning altitude and provided to a crew alerting system 170. The third alert signal may be a warning signal that could be displayed on a display unit, and it could be displayed in a color associated with the warning signal such as yellow or amber. This warning signal could cause an aural alert to be provided to the pilot through an aural alert unit.

It should be noted that the method steps described above are embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating an alert signal in a terrain awareness and warning system of an aircraft, said system comprising:
 a forward-looking weather radar system configured to
  acquire data representative of terrain located within a search volume bounded by configurable lateral limits, and
  generate a terrain data set representative of only a first location of the highest terrain cell within the search volume;
 an airport database;
 a navigation system;
 a forward-looking terrain alert processor ("FLTA processor") configured to
  receive the terrain data set from the forward-looking weather radar system,
  determine a measured terrain clearance altitude of the highest terrain cell,
  retrieve airport-related data from the airport database,
  receive first data representative of the position, altitude, and attitude of the aircraft from the navigation system,
  define a phase of flight and flight attitude parameter,
  define a required terrain clearance altitude as a function of the phase of flight and flight attitude parameter,
  generate a first alert signal if the measured terrain clearance altitude is equal to or less than the required terrain clearance altitude, and
  provide the first alert signal to a crew alerting system, wherein
   the crew alerting system is configured to receive the first alert signal.

2. The system of claim 1, wherein
the FLTA processor is further configured to
 receive second data representative of the speed of the aircraft from the navigation system, and
 include the second data when the phase of flight and flight attitude parameter is defined.

3. The system of claim 1, wherein the crew alerting system is comprised of a display unit.

4. The system of claim 1, wherein the crew alerting system is comprised of an aural alert unit.

5. The system of claim 1, further comprising:
a terrain database, where
 the FLTA processor is further configured to
  receive second data representative of the heading of the aircraft from the navigation system,
  determine a second location of the highest terrain cell as a function of the terrain data set and the position and heading of the aircraft,
  retrieve terrain data from the terrain database, where the terrain data is representative of the second location and elevation of the highest terrain cell,
  define a minimum operating altitude as a function of the elevation of the highest terrain cell and the required terrain clearance altitude,
  determine a first climb gradient between two points, where
   the first point is based upon the position and altitude of the aircraft, and
   the second point is based upon the second location of the highest terrain cell and the minimum operating altitude,
  generate a second alert signal if the first climb gradient is equal to or less than a configurable second climb gradient, and
  provide the second alert signal to the crew alerting system, wherein
   the crew alerting system is further configured to receive the second alert signal.

6. The system of claim 1, further comprising:
a terrain database, where
 the FLTA processor is further configured to
  receive second data representative of the heading and vertical speed of the aircraft from the navigation system,
  determine a second location of the highest terrain cell as a function of the terrain data set and the position and heading of the aircraft,
  retrieve terrain data from the terrain database, where the terrain data is representative of the elevation of the highest terrain cell,
  define a minimum operating altitude as a function of the elevation of the highest terrain cell and the required terrain clearance altitude,
  define a first descent alerting altitude as a function of
   the phase of flight and flight attitude parameter,
   the vertical speed of the aircraft,
   the elevation of the highest terrain cell, and
   a first alert altitude configurable as a function of the phase of flight and flight attitude parameter and the vertical speed of the aircraft,
  generate a second alert signal if the altitude of the aircraft is equal to or less than first descent alerting altitude, and
  provide the second alert signal to the crew alerting system, wherein
   the crew alerting system is further configured to receive the second alert signal.

7. The system of claim 6, wherein
the FLTA processor is further configured to
 define a second descent alerting altitude as a function of
  the phase of flight and flight attitude parameter,
  the vertical speed of the aircraft,
  the elevation of the highest terrain cell, and
  a second alert altitude configurable as a function of the phase of flight and flight attitude parameter and the vertical speed of the aircraft, and
 generate a third alert signal if the altitude of the aircraft is equal to or less than the second descent alerting altitude,
 provide the third alert signal to the crew alerting system, wherein
  the crew alerting system is further configured to receive the third alert signal.

8. A method for generating an alert signal in a terrain awareness and warning system of an aircraft, said method comprising:
 receiving a terrain data set from a forward-looking weather radar system configured to
  acquire data representative of terrain located within a search volume bounded by configurable lateral limits, and generate a terrain data set representative of only a first location of the highest terrain cell within the search volume;
determining a measured terrain clearance altitude of the highest terrain cell;
retrieving airport-related data;
receiving data representative of the position, altitude, and attitude of the aircraft;
defining a phase of flight and flight attitude parameter;
defining a required terrain clearance altitude as a function of the phase of flight and flight attitude parameter;
generating a first alert signal if the measured terrain clearance altitude is equal to or less than the required terrain clearance altitude; and
providing the first alert signal to a crew alerting system.

9. The method of claim 8, further comprising of
receiving data representative of the heading of the aircraft;
determining a second location of the highest terrain cell as a function of the terrain data set and the position and heading of the aircraft;
retrieving terrain data, where
the terrain data is representative of the second location and elevation of the highest terrain cell;
defining a minimum operating altitude as a function of the elevation of the highest terrain cell and the required terrain clearance altitude;
determining a first climb gradient between two points, where
the first point is based upon the position and altitude of the aircraft, and
the second point is based upon the second location of the highest terrain cell and the minimum operating altitude;
generating a second alert signal if the first climb gradient is equal to or less than a configurable second climb gradient; and
providing the second alert signal to the crew alerting system.

10. The method of claim 8, further comprising of
receiving data representative of the heading and vertical speed of the aircraft;
determining a second location of the highest terrain cell as a function of the terrain data set and the position and heading of the aircraft;
retrieving terrain data, where
the terrain data is representative of the elevation of the highest terrain cell;
defining a minimum operating altitude as a function of the elevation of the highest terrain cell and the required terrain clearance altitude;
defining a first descent alerting altitude as a function of
the phase of flight and flight attitude parameter,
the of vertical speed of the aircraft,
the elevation of the highest terrain cell, and
a first alert altitude configurable as a function of the phase of flight and flight attitude parameter and the vertical speed of the aircraft;
generating a second alert signal if the altitude of the aircraft is equal to or less than the first descent alerting altitude; and
providing the second alert signal to the crew alerting system.

11. The method of claim 10, further comprising:
defining a second descent alerting altitude as a function of
the phase of flight and flight attitude parameter,
the vertical speed of the aircraft,
the elevation of the highest terrain cell, and
a second alert altitude configurable as a function of the phase of flight and flight attitude parameter and the vertical speed of the aircraft;
generating a third alert signal if the altitude of the aircraft is equal to or less than the second descent alerting altitude; and
providing the third alert signal to the crew alerting system.

* * * * *